United States Patent [19]
Kikuchi et al.

[11] Patent Number: 5,371,428
[45] Date of Patent: Dec. 6, 1994

[54] PIEZOELECTRIC TRANSDUCER

[75] Inventors: Takashi Kikuchi; Takashi Wada, both of Tokyo, Japan

[73] Assignee: TDK Corporation, Tokyo, Japan

[21] Appl. No.: 139,310

[22] Filed: Oct. 19, 1993

[30] Foreign Application Priority Data

| Oct. 27, 1992 | [JP] | Japan | 4-080357[U] |
| Nov. 6, 1992 | [JP] | Japan | 4-083138[U] |
| Nov. 11, 1992 | [JP] | Japan | 4-84303[U] |

[51] Int. Cl.$^5$ ............... H01L 41/08; H04R 17/00
[52] U.S. Cl. .......................... 310/324; 310/322; 310/348
[58] Field of Search ................. 310/322, 324, 348

[56] References Cited

U.S. PATENT DOCUMENTS

| 3,700,938 | 10/1972 | Bryant | 310/324 |
| 4,006,371 | 2/1977 | Quirke | 310/322 |
| 4,240,002 | 12/1980 | Tosi et al. | 310/324 |
| 4,278,851 | 7/1981 | Takaya | 179/179 |
| 4,287,447 | 9/1981 | Skoda et al. | 310/348 |
| 4,626,729 | 12/1986 | Lewiner et al. | 310/324 |
| 4,965,483 | 10/1990 | Abe et al. | 310/324 |
| 5,161,200 | 11/1992 | Barr | 381/173 |
| 5,196,754 | 3/1993 | Berthold et al. | 310/324 |

FOREIGN PATENT DOCUMENTS

| 0200695 | 6/1983 | German Dem. Rep. | 310/322 |
| 3446183 | 6/1986 | Germany | 310/322 |
| 61-89800 | 7/1936 | Japan | H04R 17/00 |
| 0199298 | 10/1985 | Japan | 310/348 |
| 0013800 | 1/1986 | Japan | 310/322 |
| 61-75698 | 5/1986 | Japan | H04R 17/00 |
| 61-111298 | 7/1986 | Japan | H04R 17/10 |
| 61-111299 | 7/1986 | Japan | H04R 17/10 |
| 62-86799 | 6/1987 | Japan | H04R 17/10 |
| 238558 | 10/1990 | Japan | H04R 17/10 |

*Primary Examiner*—Thomas M. Dougherty
*Attorney, Agent, or Firm*—Peter Jon Gluck

[57] ABSTRACT

The case has an opening and a wall section with a hole provided on the wall section and the wall section forms an inner space. The case also has a recessed area surrounding the hole. The piezoelectric diaphragm is supported around its periphery on top of the case so that an enclosure, including the hole, is formed within the inner space. An acoustic resistance sheet is bonded on to the wall section with the adhesive that is filled into the recessed area to close off the hole. With this structure, defective damping caused by seeping of the adhesive is prevented.

10 Claims, 4 Drawing Sheets

PIEZOELECTRIC TRANSDUCER

BACKGROUND OF THE INVENTION

1. Field of the Invention

The present invention relates to a piezoelectric transducer, in particular, it relates to an improvement on the type of piezoelectric transducer commonly used for telephones, intercom systems and the like.

2. Discussion of Background

In piezoelectric transducers of this type, there is normally a considerable difference between the resonance frequency of the piezoelectric diaphragm and the cavity resonance frequency, resulting in poor frequency characteristics between the two resonance frequencies. As a means to solve this problem, a technology that uses a fabric damper is known in the prior art. In this technology, an appropriate degree of acoustic resistance is created by the fabric damper to flatten the frequency characteristics and to improve the frequency band width. This technology was disclosed in, for example, Japanese Laid Open Utility Model Publication 17899/1988. The fabric damper is usually made of a cloth with several hundred openings/inch and with this, the acoustic resistance requirement for flattening the frequency characteristics is ensured. The fabric damper is bonded onto the case that supports the piezoelectric diaphragm with an adhesive. The area in which the fabric damper is to be bonded has a damping hole and the entire surface of the fabric damper, excluding the area that corresponds to the damping hole, is adhered to the case. Such technology is disclosed in, for example, the aforementioned Japanese Laid Open Utility Model Publication No. 17899/1988.

Another reference on the prior art is Japanese Laid Open Utility Model Publication No. 68298/1988. This piezoelectric transducer is provided with a ring-like end surface on the circumference of the inner space of the case. The circumference of the piezoelectric diaphragm is secured on to the end surface of the case with an adhesive and a enclosure is formed by the inner space on the adhered surface-side. Lead wires are lead out to the outside from the enclosure. The lead wires are lead out to the outside of the case via a passage provided through part of the case. In order to maintain an air tight seal within the enclosed portion, this passage is sealed with a material such as silicon resin. The above mentioned piezoelectric transducer is disclosed in a receiver and transmitter described in Japanese Laid Open Utility Model Publication No. 135851/1989. The two piezoelectric transducers, one for transmission and the other for reception, are separately arranged inside the handset main unit so that they correspond with the receiving and transmitter sections. In order to maintain an air tight seal between the space leading to the piezoelectric transducers and the inner space of the handset main unit, a packing member is provided between the two spaces. The packing member is provided as an independent component, separate from the piezoelectric transducers and the handset main unit and it is secured between the piezoelectric transducers and the handset main unit by the assembly clamping force of the piezoelectric transducers against the handset main unit.

As described above, since the fabric damper is made of a meshed cloth, when it is bonded with an adhesive, the adhesive tends to seep all over the surface of the bonded area surrounding the damping hole, resulting in deterioration of the acoustic characteristics of the fabric damper and consequently causing a damping failure. The foregoing represents a problem with the above-mentioned prior art technology. The prior art technology described above does not disclose any means for solving this problem of damping failure due to seeping adhesive.

Also, since the lead wires connected to the piezoelectric element are lead out to the outside of the case via a passage provided in part of the case, the sealing agent for maintaining the air tight seal of the enclosure sometimes runs out via the passage to the surface of the outer circumference of the case, resulting in a defective product.

Moreover, since, in the prior art receiver and transmitter, the packing member is provided as an independent component, separate from the piezoelectric transducer and the handset main unit, and is secured between the piezoelectric transducers and the handset main unit by the assembly clamping force of the piezoelectric transducers against the handset main unit, the packing member is liable to shift at the time of assembly causing misalignment and resulting in loss of the air tight seal. Therefore, extra care must be taken so that misalignment will not occur. This means reduced efficiency in assembly work. Furthermore, the misalignment problem can never totally solved, even when maximum care is taken in assembly. Also, as the packing member is an independent component, separate from the handset main unit and the piezoelectric transducers, the number of components and assembly steps is greater so production costs are increased.

SUMMARY OF THE INVENTION

It is an object of the present invention to provide a piezoelectric transducer which converts the vibration of the diaphragm, caused by acoustic waves, into electric signals with the piezoelectric effect of the piezoelectric element and which also converts the electric signals supplied to the piezoelectric element to acoustic waves.

It is a further object of the present invention to provide a piezoelectric transducer in which a damping failure, caused by seep-through of the adhesive, is prevented.

It is a still further object of the present invention to provide a piezoelectric transducer in which the sealing agent can be prevented from running out of, or adhering to the lead out channel for the lead wires.

It is a still further object of the present invention to provide a piezoelectric transducer in which misalignment of the packing member can be prevented when it is installed into the handset composed of the receiver and the transmitter and one in which assembly can be made simpler with the number of components and assembly steps reduced, allowing a reduction in production costs.

In order to achieve the above described objects, the piezoelectric transducer according to the present invention comprises a case, a piezoelectric diaphragm and an acoustic resistance sheet. The case forms an inner space and is provided with a hole on the wall section that encloses the inner space and the wall section has a recessed area surrounding the hole. The piezoelectric diaphragm is supported around its periphery by the case in such a manner that an enclosure, including the hole, is created within the inner space and the acoustic resistance sheet is bonded onto the wall section with an adhesive that is filled into the recessed area to close off the hole.

As described above, since the case has an inner space and the piezoelectric diaphragm is supported around its periphery on the case in such a manner that an enclosure is created within the inner space, a piezoelectric transducer which converts the vibration of the diaphragm caused by acoustic waves into electric signals with the piezoelectric effect of the piezoelectric element and which also converts the electric signals supplied to the piezoelectric element to acoustic waves, can be achieved.

Since the case has a hole which is provided on the wall section that forms the inner space, and the piezoelectric diaphragm is supported around its periphery on the case in such a manner that an enclosure including the hole is created within the inner space, and an acoustic resistance sheet is bonded onto the wall section with an adhesive to close off the hole, a suitable degree of acoustic resistance can be applied with the acoustic resistance sheet and the hole to flatten the frequency characteristics and thereby improve the frequency characteristics.

Since the case has a recessed area surrounding the hole on the wall section that forms the inner space, and the acoustic resistance sheet is bonded onto the wall section with an adhesive that is filled into the recessed area, the recessed area functions as a reservoir for the adhesive to absorb variations in the quantity of adhesive that is filled in. Also, even when the quantity of adhesive is set at a relatively high level to facilitate production, overflow from the recessed area will be reduced, with a similar result in effect to that achieved when a very small amount of adhesive is applied. Because of this, defective adhesion caused by overflow of adhesive and the resulting over adhesion, can be prevented. Defective damping caused by excessive seeping absorption of adhesive into the acoustic resistance sheet can, thereby, be prevented.

Next, the case is provided with an outer wall section and a projection. The outer wall section forms the aforementioned inner space and at the same time, has a ring-like staged surface surrounding the inner space. The projection extends out from the outer wall section and has a recessed channel flush with the ring-like staged surface. The lead wires are lead out from the enclosure via the channel. With this structure, the lead out area for the lead wires is enlarged, making it less likely for the sealant to adhere to the outer circumference of the case, reducing the likelihood of products with visual defects being produced. Also, with a holding member inserted into the channel, the seal can be made even more secure.

Furthermore, the aforementioned case has an opening on the mounting surface side and a ring-like packing member is provided as an integrated unit on the end surface surrounding the opening. With this structure, the area surrounding the space leading to the opening can be sealed with a packing member simply by mounting the case so that the mounting surface side, where the opening is provided, is facing the handset main unit and constitutes the mounting surface when the case is assembled into the handset receiver or transmitter. During this assembly work, there is no room for the packing member to shift between the piezoelectric transducers and the handset main unit. Therefore, misalignment of the packing member is prevented and an air tight seal can be assured. Moreover, assembly itself is simpler with a reduced number of component sand assembly steps making it possible to realize a cost reduction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Figure 1:
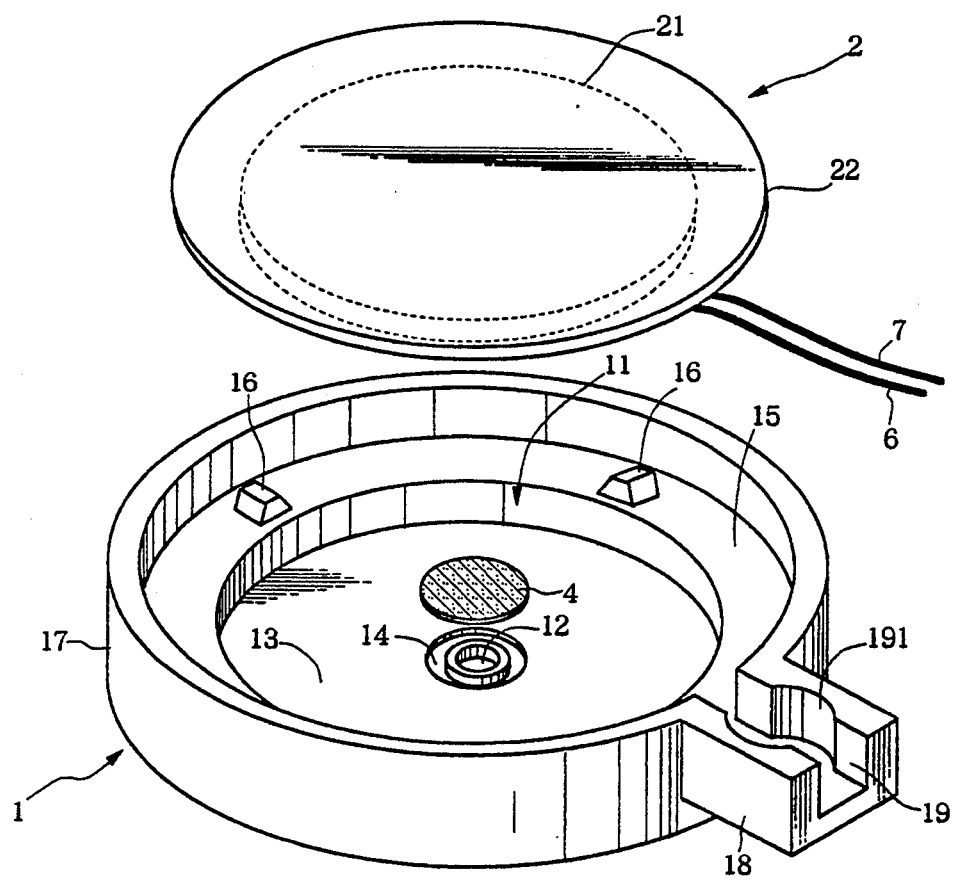
FIG. 1 is an exploded perspective view of the piezoelectric transducer according to the present invention.
Figure 2:
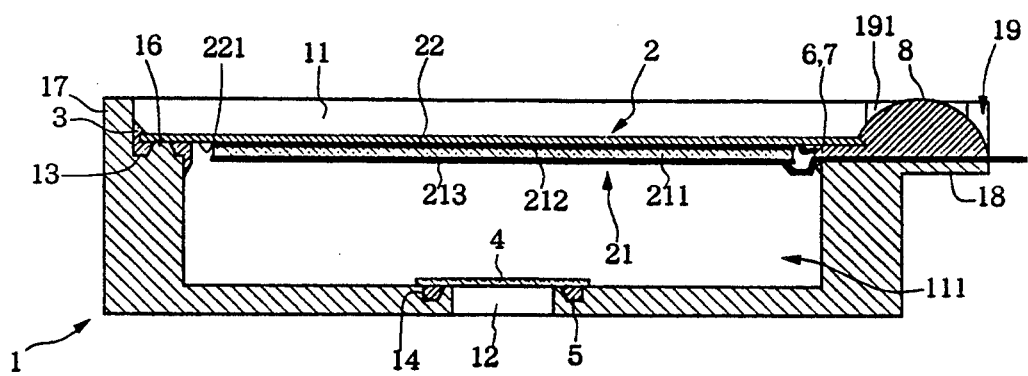
FIG. 2 is a cross section of the piezoelectric transducer illustrated in FIG. 1.

As shown in FIGS. 1 and 2, the piezoelectric transducer according to the present invention includes a case 1, a piezoelectric diaphragm 2, an adhesive 3, acoustic resistance sheet 4 and another adhesive 5.

The case 1 has an inner space 11 and a hole 12. The hole 12 is provided on the wall section 13 that forms the inner space 11 and the wall section 13 has a recessed area 14 surrounding the hole 12. The case 1 is made of a suitable material such as a synthesized resin or the like. In the figures, the wall section 13 where the hole 12 is provided, constitutes the bottom of the inner space 11.

The piezoelectric diaphragm 2 is supported around its periphery on the case 1 in such a manner that an enclosure 111 including the hole 12 is created within the inner space 11. The staged surface 15 that supports the periphery of the piezoelectric diaphragm 2 is formed ring-like around the inner space 11. The piezoelectric diaphragm 2 is bonded on to the staged surface 15 with the adhesive 3. The piezoelectric diaphragm 2 has a piezoelectric element section 21 and a diaphragm section 22. The piezoelectric element section 21 comprises a piezoelectric porcelain 211 with electrodes 212, 213 on its opposite surfaces and it is bonded to one end 221 of the diaphragm section 22.

The acoustic resistance sheet 4 is bonded onto the wall section 13, that constitutes the bottom, with an adhesive 5 that is filled into the recessed area 14 to close off the hole 12. The acoustic resistance sheet 4 is made of a meshed cloth with several hundred openings/inch. The electrodes 212, 213 of the piezoelectric element section 21 are connected with lead wires 6, 7 respectively.

As explained above, since the case 1 has an inner space 11 and the piezoelectric diaphragm 2 is supported around its periphery on the case 1 in such a manner that an enclosure 111 is created within the inner space 11, a piezoelectric transducer in which a vibration of the piezoelectric diaphragm 2 caused by acoustic waves is thereby converted into electric signals with the piezoelectric effect of the piezoelectric element section 21 which also converts the electric signals supplied to the electrodes 212, 213 of the piezoelectric element section 21 via the lead wires 6,7 into acoustic waves for output, is achieved.

Figure 3:
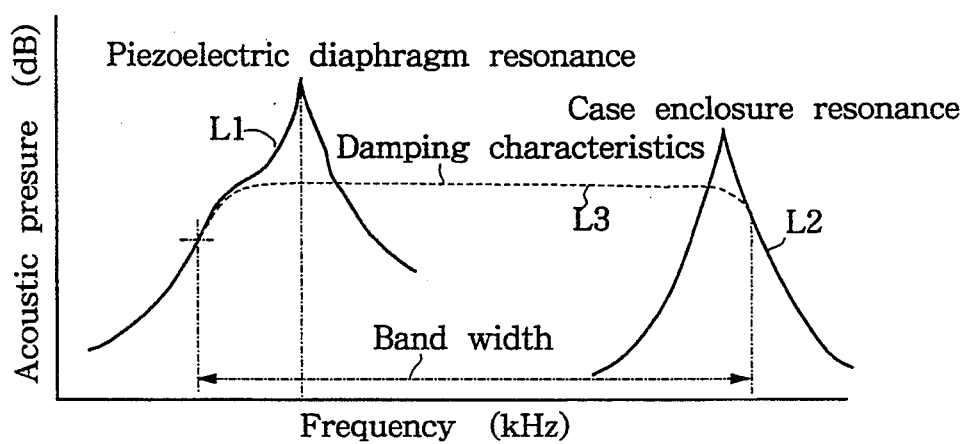
FIG. 3 illustrates the frequency-acoustic pressure characteristics of the piezoelectric transducer.

Also, as the case 1 has a hole 12 which is provided on the wall section 13 that forms the inner space 11 and the piezoelectric diaphragm 2 is supported around its periphery on the case 1 in such a manner that an enclosure 111 including the hole 12 is created within the inner space and the acoustic resistance sheet 4 is bonded onto the wall section 13 with an adhesive 5 to close off the hole 12, a suitable degree of acoustic resistance damping is achieved with the acoustic resistance sheet 4 and the hole 12 to flatten the frequency characteristics and thereby improve the frequency characteristics. FIG. 3 shows the frequency-acoustic pressure characteristics. In the FIG. 3, resonance frequency (kHz) is plotted on the x axis and acoustic pressure (dB) is plotted on the y axis. The curve L1 indicates the resonance characteristics of the piezoelectric diaphragm, the curve L2 indicates the enclosure resonance characteristics of the case and the curve L3 indicates the synthesized characteristics with the damping by the damping resistance sheet 4 figured in.

As shown in FIG. 3, although there is a fairly large difference between the resonance frequency of the piezoelectric diaphragm 2 and the resonance frequency of the enclosure 111, the frequency characteristics are flattened and the frequency band-width is widened by employing the acoustic resistance sheet 4.

Furthermore, the wall section 13 that forms the inner space 11 has a recessed area 14 around the hole 12, and the acoustic resistance sheet 4 is bonded onto the wall section 13 with an adhesive 5 that is filled into the recessed area 14, and the recessed area 14 functions as a reservoir for the adhesive 5 to absorb any variations in the quantity of adhesive 5 filled in. Also, even when the quantity of adhesive 5 is set at a relatively high level to facilitate production, overflow from the recessed area 14 will be contained, with a similar result in effect to that achieved when a very small amount of adhesive is applied. Because of this, defective adhesion caused by overflow of adhesive and the resulting over adhesion, can be prevented. Consequently, defective damping caused by excessive seeping absorption of adhesive 5 into the acoustic resistance sheet 4 can be prevented.

Moreover, there are three raised portions 16 provided spaced apart from each other on the staged surface 15. The raised portions 16 are triangular, rectangular or some other polygonal shape or arc-shaped. There should be at least 3 of them. The diaphragm section 22 is positioned on top of the raised portions 16, so that at least 3 support points are required to support the piezoelectric diaphragm 2 stably. Because of this, it is possible to support the piezoelectric diaphragm 2 stably at near horizontal without tilting, in order to secure specific frequency characteristics. Also, as the diaphragm section 22 is positioned on top of the raised portions 16 and bonded to the case 1 with adhesive 3, the overall frequency characteristics, and particularly the low frequency characteristics, are improved.

In addition, case 1 is provided with an outer wall section 17 and a projection 18. The outer wall section 17 forms the inner space 11 and at the same time, has a ring-like staged surface 15 surrounding the inner space 11. The projection 18 extends out of the outer wall section 17 and has a recessed channel 19, the bottom of which is flush with the staged surface 15 and the lead wires 6, 7 are lead out from the enclosure 111 via the recessed channel 19.

As has been explained above, the case 1 is provided with the projection 18 extending out from the outer wall section 17 and has a recessed channel 19, the bottom of which is flush with the ring-like stage surface 15, and the lead wires 6, 7 are lead out from the enclosure 111 through the recessed channel 19. The lead out area for the lead wires is enlarged, making it less likely for the sealant to adhere to the outer circumference of the case, reducing the likelihood of products with visual defects being produced.

The recessed channel 19 has a widened section 191 in the middle and in this widened section 191 a holding member 8 made of silicon rubber or the like is inserted or attached. The lead wires 6, 7 are held fast with this holding member 8 and sealed.

Figure 4:
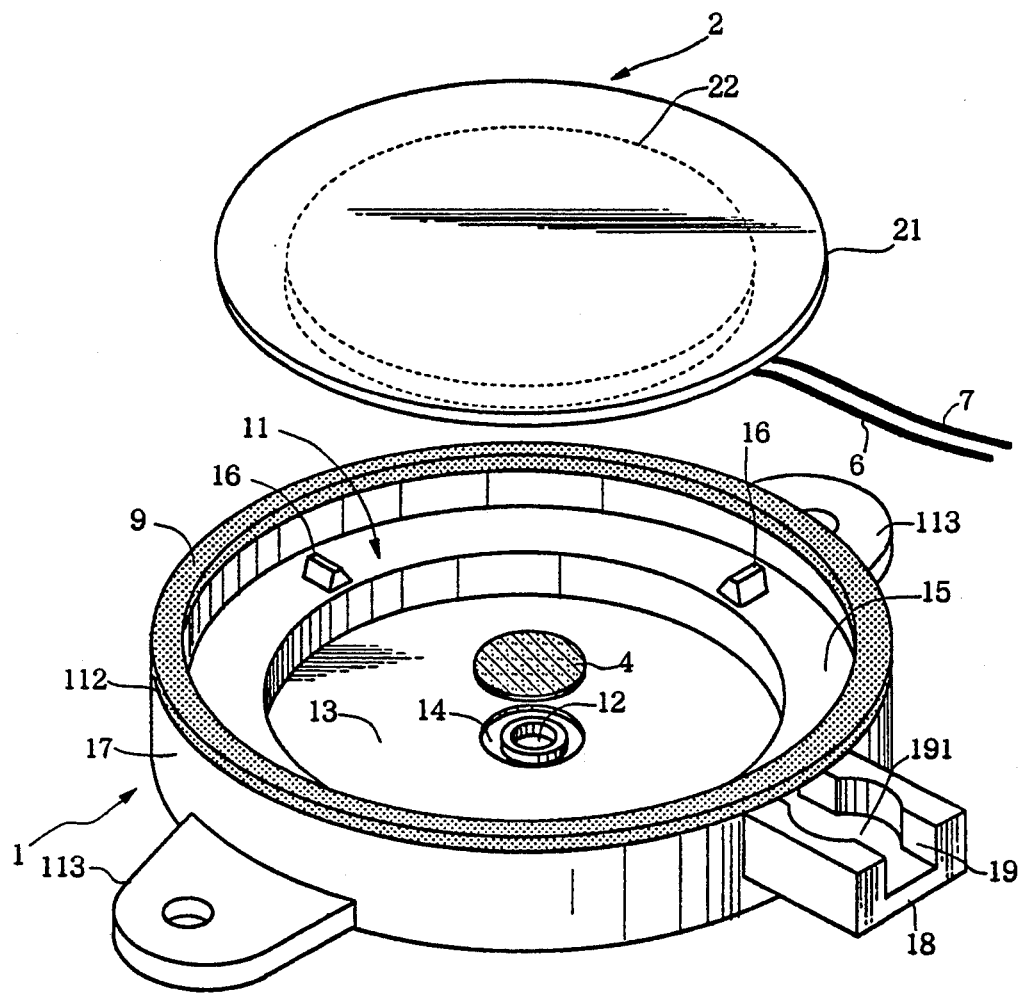
FIG. 4 is an exploded perspective view of another embodiment of the piezoelectric transducer according to the present invention.
Figure 5:
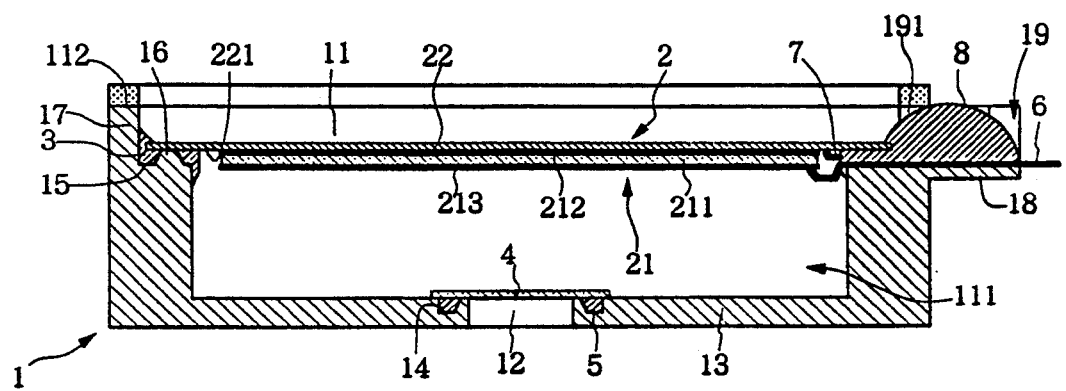
FIG. 5 is a cross section of the piezoelectric transducer illustrated in FIG. 4.

Next, as can be seen in FIGS. 4 and 5, the ring-like packing member 9 is provided as an integrated unit on the end surface 112 that constitutes the mounting surface at the circumference of the open end of case 1. This packing member 9 can be formed by applying the required thickness of an elastic resin such as a silicon resin, a urethane resin, or an organic adhesive. The case 1 is also provided with 2 to 3 mounting brackets 113 to be used for mounting the piezoelectric transducer into the handset main unit.

Figure 6:
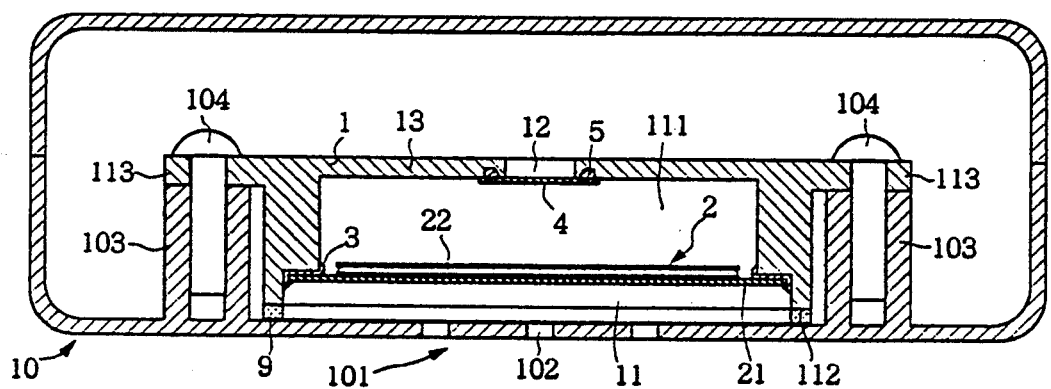
FIG. 6 is a partial cross section of a receiver which employs the piezoelectric transducer illustrated in FIGS. 4 and 5 in its assembled state.

The piezoelectric transducer shown in FIGS. 4 and 5 is installed in a receiver as shown in FIG. 6. In the FIG. 6, the handset main unit 10 has a receiver section 101. The receiver section 101 has holes 102 that run from the inside to the outside. Although not shown in the figures, this type of handset has a transmitter section structured similar to that of the receiver section 101. The transmitter section is provided on the other side of the handset main unit 10, opposite the receiver section 101. Explanations herein are given on the assumption that the transmitter section is similar in structure to the receiver section, so that descriptions of the receiver section will apply equally to the transmitter section.

The piezoelectric transducer is positioned inside the handset main unit 10 in such a manner that the opening in the case 1 corresponds with the receiver section 101 and is secured on to the mounting columns 103 with the mounting screws 104. The packing member 9 seals off the area including the space which runs from the holes 102 through the opening.

As has been explained using FIGS. 4 and 5, the piezoelectric transducer is provided with a ring-like packing member 9 as an integrated unit at the circumference of the opening on the end surface 112 that constitutes the mounting surface. Therefore, simply by mounting the case into the handset main unit with the mounting surface on the opening facing the handset main unit, the area including the space leading to the opening can be sealed off with packing member 9. During this assembly work, there is no room for the packing member 9 to shift between the piezoelectric transducer and the handset main unit. Thus, misalignment of the packing member is prevented and an air tight seal can be assured. Moreover, assembly itself is simpler with a reduced number of components and assembly steps, making it possible to realize a cost reduction.

The handset main unit 10 has holes 102 in the receiver section 101 and the holes 102 communicate from the inside to the outside. The piezoelectric transducer is positioned inside the handset main unit 10 so that it corresponds with the receiver section 101. The packing member 9 seals off the space from the holes 102 through the piezoelectric transducer 2. With this structure, the acoustic waves which enter through the holes 102 provided in the receiver section 101 work efficiently on the piezoelectric transducer without leakage. Likewise, the acoustic waves output from the piezoelectric transducer provided in the transmitter section, go to the outside efficiently from the unit through the holes in the transmitter section without leakage.

Obviously, numerous modifications and variations of the present invention are possible in light of the above descriptions. It is to be understood, therefore, that within the scope of the appended claims, the invention may be practically realized in other ways than those specifically described herein.

What is claimed is:

1. A piezoelectric transducer comprising; a case, a piezoelectric diaphragm and an acoustic resistance sheet wherein:
   said case forms an inner space, and is provided with a hole on the wall section that forms said inner space, and a recessed area surrounding said hole;
   said piezoelectric diaphragm is supported around its periphery on said case in such a manner that an enclosure, including said hole, is created within said inner space; and
   said acoustic resistance sheet is bonded onto said wall section with an adhesive that is filled into said recessed area to close off said hole.

2. The piezoelectric transducer according to claim 1 wherein said acoustic resistance sheet is a fabric damper.

3. The piezoelectric transducer according to claim 1 wherein said hole is provided in the bottom wall section of said case.

4. The piezoelectric transducer according to claim 1 wherein:
   said case is provided with a ring-like staged surface surrounding said inner space and at least three raised portions that are spaced apart from one another are provided on said staged surface;
   said piezoelectric diaphragm is positioned on top of said raised portions and bonded on to said staged surface with an adhesive.

5. A piezoelectric transducer comprising a case and a piezoelectric diaphragm wherein:
   said case has an outer wall section that forms said inner space, a ring-like staged surface surrounding said inner space, a projection which extends out from said outer wall section, said projection having a recessed channel, the bottom of said recessed channel being flush with said staged surface;
   said piezoelectric diaphragm is supported around its periphery by said staged surface, forming an enclosure within said inner space; and
   lead wires are lead out from said enclosure via said recessed channel.

6. The piezoelectric transducer according to claim 5 with a sealing member wherein said sealing member is inserted within said recessed channel to hold fast said lead wires.

7. The piezoelectric transducer according to claim 5 including an acoustic resistance sheet wherein:
   said case is provided with a hole on the wall section that forms said inner space and said wall section has a recessed area surrounding said hole; and
   said acoustic resistance sheet is bonded onto said wall section with said adhesive, which is filled into said recessed area to close off said hole.

8. A piezoelectric transducer comprising:
   a case;
   a piezoelectric diaphragm; and
   a packing member, wherein:
   said case has an opening on the mounting surface side, a ring-shaped staged surface that steps down from said opening and a projection that extends out from the outer wall section that surrounds an inner space of said case;
   said projection has a recessed channel, the bottom of which is flushed with said staged surface;
   said piezoelectric diaphragm is mounted within said inner space of said case and is supported around its periphery by said staged surface and has its lead wires lead out through said recessed channel to the outside; and
   said packing member is provided as an integrated unit on the end surface, surrounding said opening.

9. A piezoelectric transducer comprising:
   a case;
   a piezoelectric diaphragm;
   a packing member; and,
   an acoustic resistance sheet, wherein:
   said case has an opening on the mounting surface side and a hole which is provided on the wall section of said case;
   said wall section forms an inner space and has a recessed area surrounding said hole;
   said piezoelectric diaphragm is mounted within said inner space; said packing member is provided as an integrated unit on the end surface, surrounding said opening of said case; and
   said acoustic resistance sheet is bounded onto said wall section with an adhesive, which is filled into said recessed area to close off said hole.

10. The piezoelectric transducer according to claims 8 or 9 wherein:
    said packing member is made of an elastic resin or adhesive.

* * * * *